United States Patent [19]

Smitt

[11] Patent Number: 5,377,020
[45] Date of Patent: Dec. 27, 1994

[54] METHOD AND APPARATUS FOR SCANNING AN ORIGINAL AND UPDATING THRESHOLD VALUES FOR USE IN THE PROCESSING OF DATA

[75] Inventor: Asbjorn Smitt, Alsgarde, Denmark

[73] Assignee: Contex A/S, Allerod, Denmark

[21] Appl. No.: 890,576

[22] Filed: May 28, 1992

[51] Int. Cl.⁵ ............................................. G06K 9/38
[52] U.S. Cl. ...................................... 358/456; 382/51
[58] Field of Search ............... 358/455, 453, 456, 466, 358/461, 18; 382/51, 19

[56] References Cited

U.S. PATENT DOCUMENTS

5,179,599  1/1993  Formanek ............................. 382/51

Primary Examiner—Stephen Brinich
Attorney, Agent, or Firm—Willian, Brinks, Hofer, Gilson & Lione

[57] ABSTRACT

A digital data representation of an original entered by optical scanning is provided by generating a data signal having grey-level values for points on a scanning line transversely to the original in the scanning. Then local threshold values of zones on the original are determined. These local threshold values are determined statistically in response to the frequency distribution of grey-level values belonging to points from line segments in the zone. The grey-level value frequency distribution of the zones is updated currently, segments from the line last scanned replacing the oldest line segments in the zones, whereby the frequency distribution is changed and updated threshold values are determined. The grey-level value of a point is compared with the updated threshold value of the zone concerned to determine a state of the point in the digital data representation, and the states of the individual points are stored to provide the digital data representation.

8 Claims, 3 Drawing Sheets

METHOD AND APPARATUS FOR SCANNING AN ORIGINAL AND UPDATING THRESHOLD VALUES FOR USE IN THE PROCESSING OF DATA

The invention concerns scanning of originals, such as letters and drawings, where the information on the original is entered optically with a scanner. Subsequently an electric representation is generated for the entered original.

Scanners of this type are widely known. With respect to the quality of a reproduced image it is important that the electric representation of the data entered by the scanner is optimum with respect to resolution and reproduction of details. The entered data are usually grey-level data, a point on the original being represented by its grey-level. The entered grey-level data are preferably digital, and an 8-bit representation (256 grey-level values) usually gives a suitable tone resolution. When subsequently reproduced, the original is usually represented by a binary representation (black/white) for each pixel. A threshold value is therefore introduced so that the electric representation of the original is reduced to comprise just a binary representation in the form of two states for each pixel. The threshold value is determined from a wish to maintain as much information as possible in the image, and the threshold value is usually determined statistically in response to the distribution of the grey-level values. U.S. Pat. No. 4,972,273 is an example of such a technique.

A large number of techniques for determining threshold values for scanners are known. In some techniques an operator enters a threshold value for an original based on experience. In other systems a threshold value is determined statistically for an original by a prescan of the original, the threshold value being used in the actual scanning in connection with the image processing procedure.

However, the fact is that an original for scanning frequently has an uneven distribution of dark and light areas, so that a threshold value determined for the entire original frequently entails that details disappear when the threshold value is introduced.

It has thus been attempted to develop techniques for dividing the original into zones to determine threshold values for the individual zones. The information of the original is entered linewise so that it has been necessary to enter and store the original in its entirety and subsequently determine the threshold values statistically. This technique is vitiated by a very important drawback—viz. storage of large data amounts. In case of a large original in e.g. AO format (36×44 inches) and with a resolution of 300 dots per inch, the stored data amount corresponds to about 143 Mbytes, since each pixel contains grey-level information corresponding to typically 8 bits. Thus, very large data amounts are to be processed merely to calculate the threshold value which is subsequently to be used for the actual data processing. Following this the individual pixels are to be compared with respective threshold values.

The applicant has recently developed and marketed a system in which local threshold values are determined by scanning the original linewise by a prescan. The original is divided into zones, and the entered line is divided into line segments in response to the zone to which the pixels in a line segment belong. The original may e.g. be divided into 16×16 zones, and each zone comprises about 550,000 pixels in the above example. The scanner contains a central control unit which may be adapted to establish a plurality of separate threshold value calculating units corresponding to the number of zones transversely to the original. The line segments are passed to respective threshold value calculating units, and the frequencies of the individual grey-levels are determined. The frequency of the grey-levels may then be used for determining a threshold value for respective zones. This threshold value determination may thus be performed without large data amounts having to be stored, since the frequency is merely registered. This can be done since the lines, in connection with the threshold value determination, are divided and sorted in line segments in response to the zones to which the pixels of a line segment in question belong. When the threshold value of a zone is determined, the value is applied to a storage means (e.g. a RAM store), in which the value is stored while the threshold value calculating unit concerned is reset. Then the threshold value calculation is repeated for the next row of zones transversely to the original until the threshold values of all zones of the original have been determined and stored in the storage means. When the original is subsequently scanned linewise, each individual pixel is compared with its respective threshold value in response to the zone to which the pixel belongs. The threshold value is read out from the storage means in response to the line number and position of the pixel concerned in the line. This provides on-line tiled thresholding.

The object of the invention is to provide a method of scanning an original, wherein grey-level values are compared with local threshold values of zones on the original, said threshold values being generated during the actual scanning, thereby making a prescan superfluous.

SUMMARY OF THE INVENTION

This object is achieved by a method of providing a digital data representation of an original entered by optical scanning, wherein a data signal having grey-level values for points on a scanning line transversely to the original is generated by the scanning, comprising
 providing local threshold values for zones on the original,
 statistically determining said local threshold values in response to the frequency distribution of grey-level values belonging to points from line segments in the zone,
 currently updating the grey-level value frequency distribution of the zone, segments from the line last scanned replacing the oldest line segments in the zones, whereby the frequency distribution is changed and updated threshold values are determined,
 comparing the grey-level value of a point and the updated threshold value of the zone concerned to determine a state of the point in the digital data representation, and
 storing the states of the individual points to provide the digital data representation.

Threshold values for zones in a belt transversely to the original are hereby calculated. This belt contains scanning lines which are moved across the original during scanning. The line whose points are being compared with local threshold values is preferably positioned centrally in this belt. The threshold values are determined by determining the frequency of the occurrence of the individual grey-levels in the zones. The threshold values are calculated from this. The frequency distribution is determined by means of stores which are counted up when the grey-level contents of new scanning lines are entered. When the entered scanning signals are allowed to pass through a delay unit, e.g. a FIFO, with a suitable delay, the grey-level contents of the delayed scanning lines may be used for counting the stores down.

The grey-level value of a point, when entered, will hereby cause the contents of a store cell to be counted one up, and when this point leaves the zone again after some time, the contents of the store cell concerned will again be counted one down. This up/down count of the contents of several of the cells is provided in that the grey-levels are transmitted through two transmission paths at different transmission rates.

The invention moreover concerns an apparatus of the type stated in claim 2 by means of which the method of the invention can be performed.

BRIEF DESCRIPTION OF DRAWINGS

The invention will be explained more fully below in connection with preferred embodiments and with reference to the drawing, in which FIG. 1 schematically shows how an original for scanning is divided into zones, FIG. 2 schematically shows a preferred embodiment of the signal processing parts of an optical scanner of the invention, FIG. 3 schematically shows how the threshold value determination is performed in the signal processor of the scanner, and FIG. 4 schematically shows another preferred embodiment of part of the scanner shown in FIG. 2.

DETAILED DESCRIPTION OF THE PREFERRED EMBODIMENT

Figure 1:
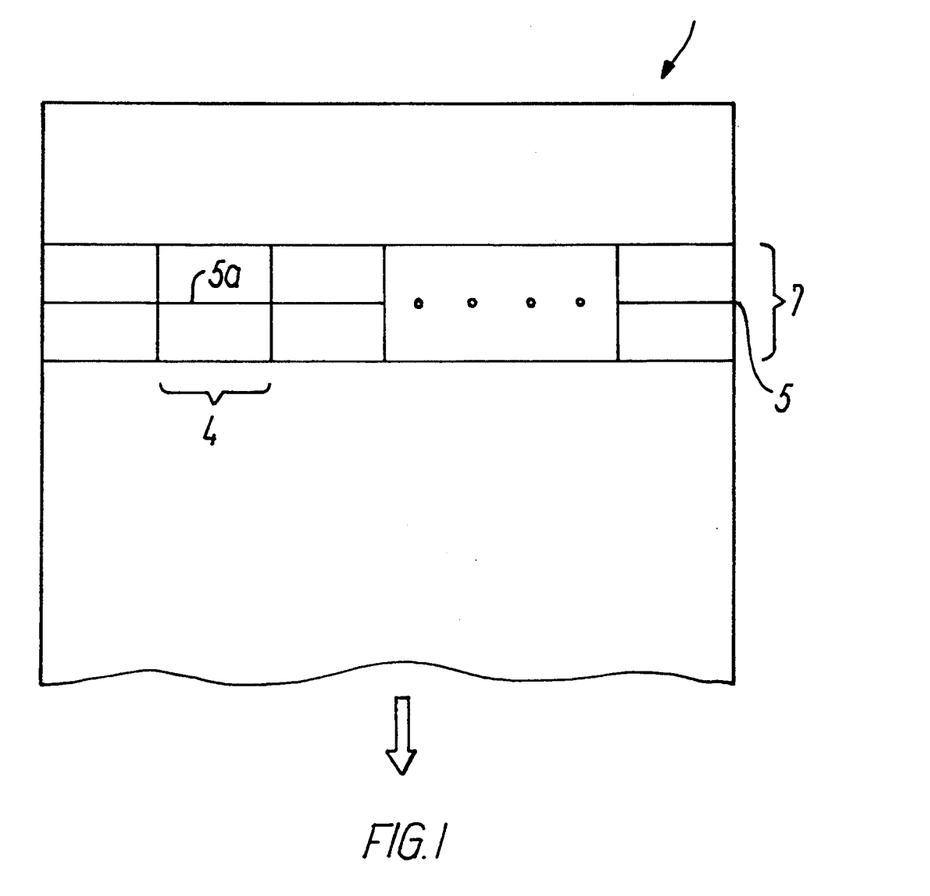

FIG. 1 shows an original 6 for scanning. The original 6 may be any medium with information which is to be transmitted to a computer by scanning, but the medium is usually pages of text, drawings, e.g. in a large format. In case of large formats the CCD unit 10 shown in FIG. 2 is constructed as stated in the applicant's own U.S. patent application Ser. 07/434,456.

In the present invention, the information on the medium is scanned linewise, said CCD unit receiving light reflected from a line 5 transversely to the original 6. A threshold value is introduced in the subsequent digitizing of the registered light level, and a signal level above the threshold value is registered as being white, while a level below the threshold value is registered as being black. The threshold values are determined for zones on the original. The points on a line 5 are compared with threshold values of zones 4, so that in reality the line 5 is divided into line segments 5a. These line segments preferably divide the zones 4 into two equal halves. The zones 4 are located in a belt 7 which is moved down over the original 6 as the new lines 5 are entered.

Figure 2:
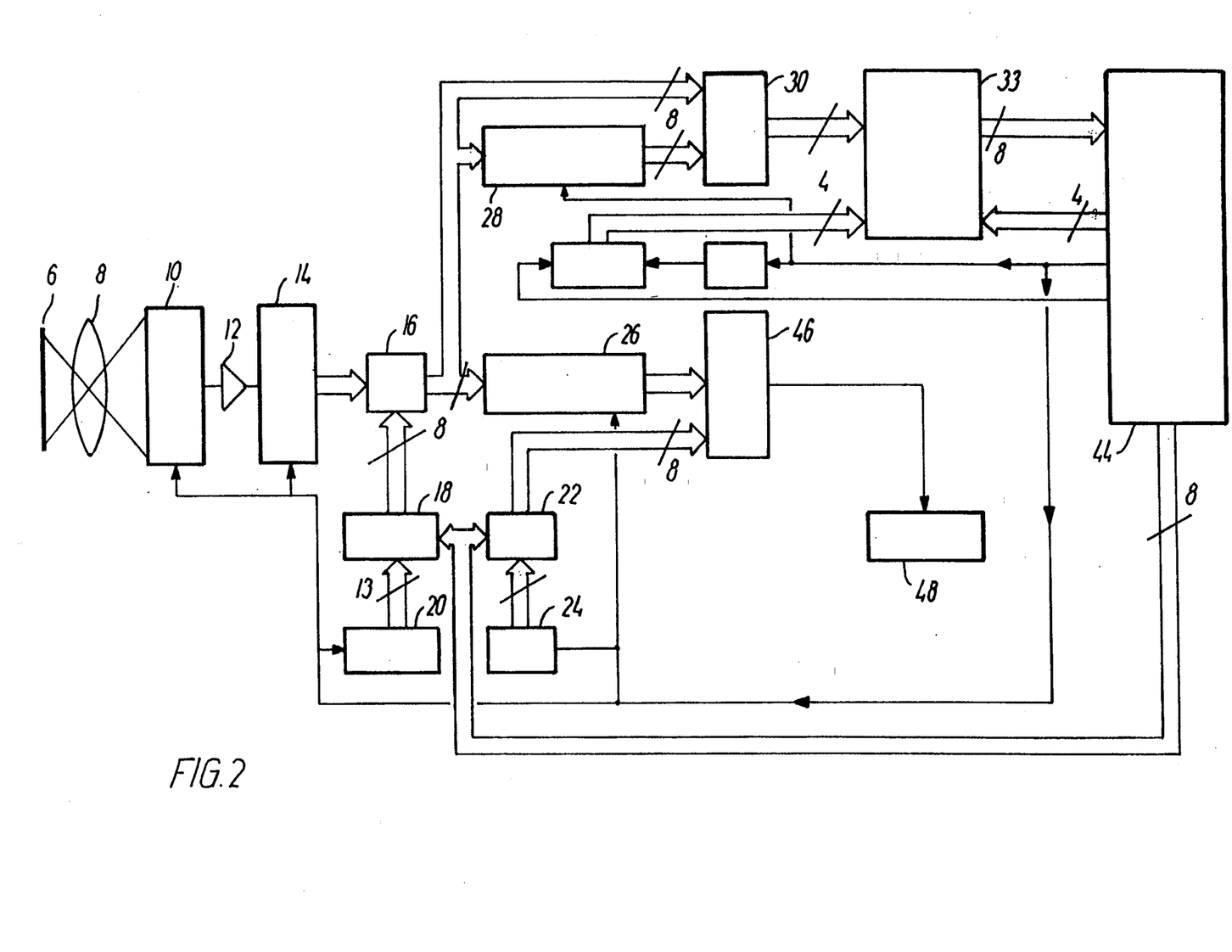

FIG. 2 shows a preferred embodiment of a scanner of the invention. The original 6 is illuminated in stripes by a light source (not shown) and is imaged through a lens 8 on a CCD unit 10, which generates an analog signal in response to the light intensity which is reflected from the line 5 on the original 6.

In the preferred embodiment in which the invention is to be explained, the CCD unit 10 has 5120 light-sensitive cells by means of which a corresponding number of pixels can be registered. The contents of the light-sensitive cells are read out serially as analog signals from the CCD unit 10 under the control of a pixel clock signal from a control unit 44. The analog signals are amplified in an amplifier 12 before being passed to an A/D converter 14, which is also controlled by the pixel clock signal. The A/D converter 14 converts the serial, analog input signal to a digital output signal, which is applied to an 8-bit data bus, and which represents raw grey-level data for points on the original. The raw grey-level data are then passed to a multiplier 16, in which the signal is multiplied by gain correction factors which, before scanning, are determined for each individual light-sensitive cell in the CCD unit 10 and are stored in a RAM store 18, in which an 8-bit gain correction factor for each individual light-sensitive cell is stored, which requires a storage capacity of $5120 \times 8$ bits. The addresses in the RAM store are pointed out by a 13-bit counter 20 (8192 possible addresses), which is controlled by the pixel clock signal and is reset at each new line, which is not shown.

The gain correction factors, which are related to the scanner and not to the original for scanning, are determined prior to scanning by an iterative procedure, wherein a well-known reference is entered by the scanner and the correction factors are counted up until each pixel gives a desired grey-level value, following which the gain correction factors are stored. This determination of the gain correction factors is performed under the control of a control unit 44 in a manner known per se.

After the gain correction for the non-linearity of the scanner the grey-level values are applied to a data bus 17, on which the signals are transmitted as 8 parallel bits. The threshold values are determined for the zones 4 shown in FIG. 1 by transmitting the digitized grey-level values to a processor unit 32 via a multiplexer 30. In the preferred embodiment 16 zones are provided transversely to the original, so that the line segments of each zone contain 320 pixels. The processor 32, which may be a conventional digital signal processor from Texas Instruments, has an associated store with a store section for each of the zones in the transverse direction of the original, in this case 16. Each of these store sections has store cells for each possible grey-level value, here 256 (8-bits), but less resolution may be used. In some cases it will e.g. be sufficient with 64 store cells, so that only the 6 most significant bits of the grey-level values are used for the addressing. Addressing of the store section of a zone is performed by dividing the pixel clock signal by 16 in a divider 42, following which it is passed to a 9-bit counter 40. The 4 most significant bits (MSB) for the counter 40 point out the data store section to which the arriving grey-level data are to be passed. The grey-level data values themselves point out one of the e.g. 256 store cells, and the contents of the store cell pointed out are counted up one.

While grey-level data are passed directly from the multiplier 16 to the processor 32 via the multiplexer 30, the data bus branches and data are passed to a buffer store 28 (FIFO), whose output is connected to the multiplexer 30 which multiplexes data from the two data bus branches and passes them to the processor 32. The buffer register 28 has a store capacity corresponding to the number of pixels in the belt 7 (FIG. 1), but a smaller store capacity may be used in practice, because the statistical determination of the threshold values may be performed on a basis where just a small portion of the pixels of a zone is used.

The data bus 17 branches so that grey-level data from a scanned line are passed to the processor 32 as soon as the line is entered by the scanner, whereby the grey-level data of a line will immediately be included in the statistical basis for the computation of the threshold values.

Data are immediately added to the store cells of the threshold value store sections. When exactly the same data are passed via the other branch of the bus through a delay (the FIFO store) of a suitable size, exactly the same grey-level data as were previously added to the store cells, can now be passed to the input of the processor again while the line "leaves" the belt 7. Subtraction of the delayed grey-level data from the store cells results in updating of the stores, so that their contents correspond exactly to the grey-level data which originate from the zones whose threshold values are to be calculated. It is hereby possible to provide a belt 7 in which the threshold values are calculated, and which is moved over the original together with the actual scanning line. As shown in FIG. 2, the contents of the FIFO store 28 may be clocked through with the pixel clock signal.

The multiplexer 30 time multiplexes the directly transmitted and the delayed grey-level signals. The time multiplexed signals are moved to the processor 32, which has an associated store 33 with a store section which is addressed by the 4 most significant bits from the counter 40. Each store section has a plurality of store cells, e.g. corresponding to the number of grey-level values, which is 256, where addressing of the store cells is performed with the actual, fed grey-level value. Each store section constitutes an electric representation of a histogram of the statistical distribution of the grey-level values within a zone.

After entering of grey-level values of a new-entered data line and a delayed line, the contents of the store section in the store 33 will be updated with respect to the new next line. The processor 32 may be programmed to calculate the threshold values using a statistical method, e.g. the one described by Kapur et al. in the article "A new Method for Gray-Level Picture Thresholding Using the Entropy of the Histogram", Computer Vision, Graphics and Image Processing 29, p. 273-285 (Academic Press. Inc. 1985). Data are transferred from the data processor 32 to the control unit 44, the latter pointing out, via a 4-bit data bus, a zone or a store section in the store of the data processor 32, the data processor then transmitting the threshold value information to the control unit 44 via a data bus. The control unit 44 passes on the threshold values calculated by the data processor 32 to a RAM store 22 in which the threshold values are stored.

The entered grey-level data are passed from the multiplier 16 to a buffer register 26. The buffer register 26 introduces a delay corresponding to the time it takes to transmit a data amount corresponding to half of the grey-level values in the belt 7 from the multiplier 16 via the data bus 17. Hereby, the data transmitted on the output of the buffer store 26 will be positioned centrally in the zones whose threshold values are stored in the RAM store 22. Data are clocked through the buffer store 26 with the pixel clock signal. Data are passed from the buffer store 26 to a comparator 46, in which data are compared with the threshold values stored in the RAM store 22. The pixel clock signal is passed to a 13-bit counter 24, whose 4 most significant bits are passed to the RAM store 22 in which a threshold value is pointed out and passed to the comparator 46. The counter 24 is reset with the line clock signal, which is not shown. The threshold values with which the grey-level signals are compared in the comparator 46, are currently exchanged in response to the line segments to which the data values concerned belong. A binary value is emitted on the output of the comparator 46 in response to whether the grey-level value of a pixel was above or below the threshold value of the zone concerned. This binary value is passed to a store 48, in which the electric representation of the original entered by the scanner is stored. The store 48 is preferably an electronic medium, but it may also be a printer printing out information directly on paper or the like.

Figure 3:
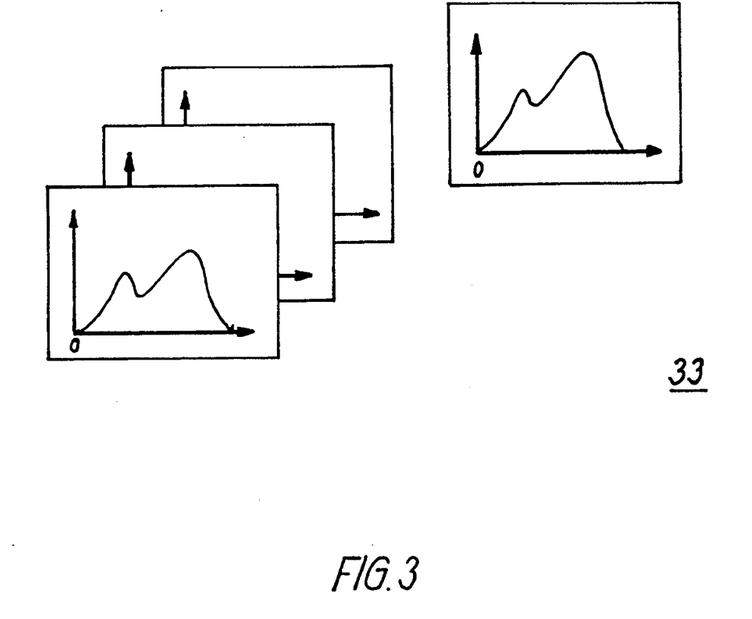

FIG. 3 schematically shows how the store 33 is divided into N store sections, N being 16 in the preceding paragraph. Each of the 16 store sections contains a counter for each grey-level value. However, the counter may also be associated with 2, 4 or more grey-level values, and the least significant bits are then not transmitted from the multiplexer 36 to the processor 32. A histogram of the distribution of the grey-levels in the zone concerned is formed in each store section. It should be noted that the histogram in practice is formed by discrete function values of the individual grey-levels. Each individual store cell in the store section is counted up or down in response to the grey-level values received. When the threshold values are calculated, the contents of the store cells are read out, and the threshold values can be determined by using algorithms known per se.

Figure 4:
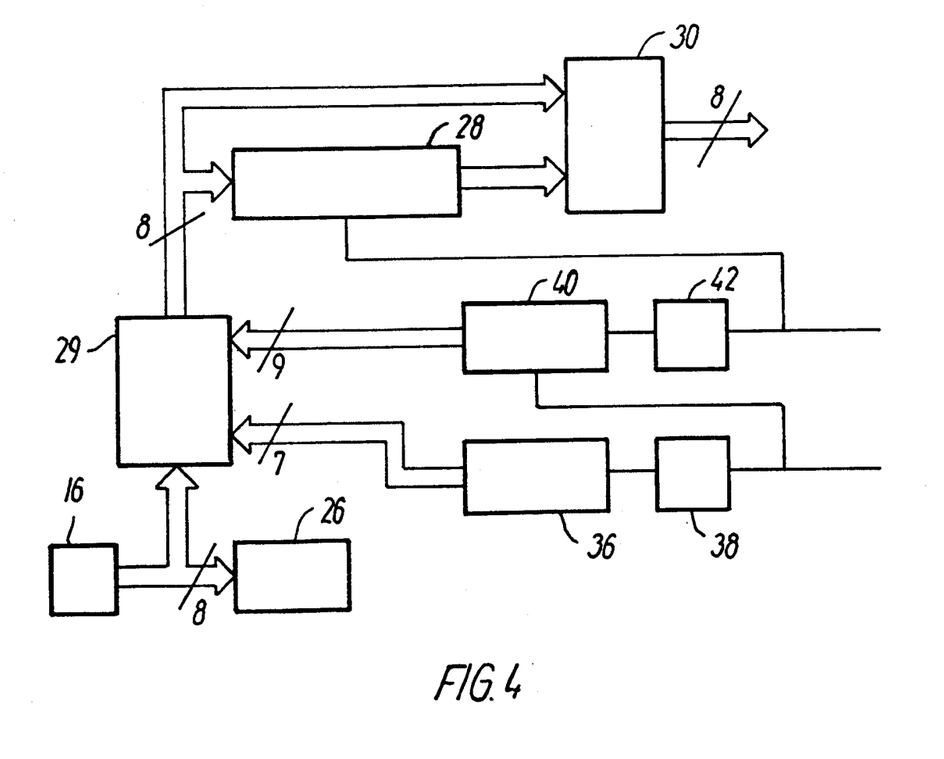

If the belt 7 (FIG. 1) contains 256 lines 5, each having 5120 pixels of 8 bits, the total data amount in the belt 7 will be about 1.3 Mbytes. It will normally be inexpedient to operate with so large buffer stores, and the buffer store 28 may therefore be selected with a size of 64 kbytes. The grey-level values are passed from the multiplexer 16 to a holding circuit 29. The holding circuit 29 is controlled by the input signals from a 7-bit counter 36 and a 9-bit counter 40. The pixel clock signal is passed via a divider 42 with a divisor P, e.g. 16, to the counter 40, whose output signals control the holding circuit 29. The line clock signal is passed via a divider 38 with a divisor N, e.g. 2, to the counter 36, whose output signal is passed to the holding circuit 29. The holding circuit 29 may be designed such as to transmit the grey-level signals received on its input to its output when a control signal applied from the counter 40 changes status while the control signals from the counter 30 occur in a predetermined manner. It will hereby be possible to incorporate each 16th grey-level value in each second line in the threshold value calculation. The buffer store 28 can thus be reduced to a size of 41 kbytes. Alternatively, the selection of grey-level values for the threshold value determination may be introduced in partly the actual buffer store unit, partly the digital signal processor. However, the size of the buffer store 26 is not changed even though the threshold values are determined statistically using a smaller number of grey-level values, the size of the buffer store 26 being determined by the size of the belt 7 shown in FIG. 1.

I claim:

1. A method of providing a digital data representation of an original entered by optical scanning, wherein a data signal having grey-level values for points on a scanning line traversely to the original is generated by the scanning, comprising:
- providing local threshold values for zones on the original, statistically determining said local threshold values in response to the frequency distribution of grey-level values belonging to points from line segments in the zone,
- changing the frequency distribution and determining updated threshold values before determining threshold values for a subsequent zone by currently updating the grey-level value frequency distribution of the zone, segments from the line last scanned replacing the oldest line segments in the zone,
- comparing the grey-level value of a point and the updated threshold value of the zone concerned to determine a state of the point in the digital data representation, and
- storing the states of the individual points to provide the digital data representation.

2. A method according to claim 1, comprising determining the grey-level value frequency distribution of the respective zones by dividing a store section for each zone into a plurality of store cells whose contents are counted up or down in response to the value of the grey-level values received.

3. An optical scanner for entering information from an original and generating a digital data representation of the original in response to the entered information, said scanner comprising:
- a CCD unit for generating a data signal with grey-level values for points along a scanning line on the original,
- a threshold value calculating unit for calculating local threshold values for zones on the original in response to the statistical distribution of the grey-level values within respective zones, said threshold value calculating unit including means for currently updating the grey-level value frequency distribution of the zone, segments from the line last scanned replacing the oldest line segments in the zone, and determining updated threshold values before determining threshold values for a subsequent zone,
- a threshold value comparator receiving said data signal, by which the grey-level values are compared with the local threshold value of the zone to which the point belongs to generate a digital data representation of the point on the original in response to the comparison,
- a branched data bus for transferring data from the CCD unit to the threshold value calculating unit,
- said database having a first and a second branch between the CCD unit and the threshold value calculating unit, said second branch accommodating a delay element which introduces a delay of signals transmitted by this branch corresponding to the time it takes to transmit a plurality of lines, preferably corresponding to the number of line segments in a zone, from the CCD unit to the threshold value calculating unit through the first branch,
- said threshold value calculating unit having a processor which currently updates the statistical distribution of the respective zones by adding grey-level values transmitted via the first branch of the data bus and subtracting grey-level values transmitted via the second branch of the data bus, and
- said processor transmitting the updated threshold values to the threshold value comparator.

4. An optical scanner according to claim 3, wherein the threshold value calculating unit has an associated store, a store section of which being associated with each zone, and that said store section is divided into a plurality of store cells whose contents are counted up or down in response to the value of the grey-level values received.

5. An optical scanner according to claim 4, wherein the delay element in the second branch of the data bus is a buffer store.

6. An optical scanner according to claim 4, wherein the branched data bus includes decimation means which sort out a predetermined portion of the grey-level values in response to their position on the original.

7. An optical scanner according to claim 4, wherein a buffer store is provided between the CCD unit and the threshold value calculating unit, said buffer store delaying the grey-level data signals before transmission to the threshold value calculating unit.

8. An optical scanner according to claim 7, wherein the delay introduced with the buffer store between the CCD unit and the threshold value calculating unit corresponds to about half of the delay introduced with the delay element in the branched data bus.

* * * * *

UNITED STATES PATENT AND TRADEMARK OFFICE
CERTIFICATE OF CORRECTION

PATENT NO. : 5,377,020
DATED : December 27, 1994
INVENTOR(S) : ASBJØRN SMITT

It is certified that error appears in the above-indentified patent and that said Letters Patent is hereby corrected as shown below:

In column 6, line 24 delete "multiplexer 36" and substitute --multiplexer 30--.

In column 6, lines 40-41 delete "multiplexer" and substitute --multiplier--.

In the Drawings

Replace drawings 1-4 with resubmitted formal drawings 1-4.

Signed and Sealed this

Twenty-fourth Day of December, 1996

Attest:

BRUCE LEHMAN

*Attesting Officer*     *Commissioner of Patents and Trademarks*